(12) United States Patent
Roth, Jr.

(10) Patent No.: US 9,468,863 B2
(45) Date of Patent: Oct. 18, 2016

(54) SYSTEM AND METHOD OF DESALINATING SEAWATER

(71) Applicant: Herbert J. Roth, Jr., Bloomfield, MI (US)

(72) Inventor: Herbert J. Roth, Jr., Bloomfield, MI (US)

(*) Notice: Subject to any disclaimer, the term of this patent is extended or adjusted under 35 U.S.C. 154(b) by 490 days.

(21) Appl. No.: 13/937,255

(22) Filed: Jul. 9, 2013

(65) Prior Publication Data

US 2015/0014147 A1    Jan. 15, 2015

(51) Int. Cl.
| | | |
|---|---|---|
| *C02F 1/14* | (2006.01) | |
| *B01D 5/00* | (2006.01) | |
| *B01D 1/26* | (2006.01) | |
| *C02F 1/04* | (2006.01) | |
| *C02F 103/08* | (2006.01) | |
| *C02F 101/10* | (2006.01) | |

(52) U.S. Cl.
CPC ............ *B01D 5/006* (2013.01); *B01D 1/26* (2013.01); *B01D 5/0006* (2013.01); *B01D 5/0051* (2013.01); *C02F 1/045* (2013.01); *C02F 1/14* (2013.01); *C02F 2101/10* (2013.01); *C02F 2103/08* (2013.01); *C02F 2201/005* (2013.01); *C02F 2303/04* (2013.01); *Y02W 10/33* (2015.05); *Y02W 10/37* (2015.05)

(58) Field of Classification Search
CPC .. B01D 1/0005; B01D 1/0006; B01D 1/006; B01D 1/0051; B01D 1/26; C02F 1/14; C02F 1/045

See application file for complete search history.

(56) References Cited

U.S. PATENT DOCUMENTS

| | | | |
|---|---|---|---|
| 419,215 | A | 1/1890 | Pamphlett |
| 2,412,466 | A | 12/1946 | Miller, Jr. |
| 2,490,659 | A | 12/1949 | Snyder |
| 3,312,601 | A | 4/1967 | Wilson et al. |
| 3,408,260 | A | 10/1968 | Feldman et al. |
| 3,424,677 | A | 1/1969 | van der Heem |
| 3,440,146 | A | 4/1969 | Louw |
| 3,856,631 | A | 12/1974 | Smith, Jr. |
| 3,948,734 | A | 4/1976 | Kohl et al. |
| 4,344,847 | A | 8/1982 | Grenet |
| 5,282,979 | A | 2/1994 | Wilson |
| 5,421,962 | A * | 6/1995 | Shvarts ............... C02F 1/14 159/903 |
| 5,645,693 | A | 7/1997 | Gode |
| 6,258,215 | B1 | 7/2001 | Samsonov et al. |
| 6,383,391 | B1 | 5/2002 | Ehrenberg et al. |
| 6,607,639 | B1 | 8/2003 | Longer |
| 6,656,326 | B2 * | 12/2003 | Nagler ............... B01D 1/0005 126/600 |
| 6,767,471 | B2 | 7/2004 | Max |
| 6,833,056 | B1 | 12/2004 | Kamiya et al. |
| 7,008,515 | B1 | 3/2006 | Husson, Jr. et al. |
| 7,067,044 | B1 | 6/2006 | Coon |
| 7,198,722 | B2 | 4/2007 | Hussain |
| 7,594,980 | B2 | 9/2009 | Sandstad |
| 7,654,103 | B2 * | 2/2010 | Hsia ............... B01D 5/0066 202/176 |

(Continued)

FOREIGN PATENT DOCUMENTS

DE    19915818 A1    10/2000

*Primary Examiner* — In Suk Bullock
*Assistant Examiner* — Jonathan Miller
(74) *Attorney, Agent, or Firm* — Quinn Law Group, PLLC

(57) ABSTRACT

Saline water from a body of water is desalinated using a water purification system. Chambers of a plurality of tanks are filled with a volume of saline water. The saline water is heated to increase a pressure and produce water vapor within the chamber of each tank. A condensation valve disposed within a condensing tube is moved to an open position such that the water vapor is released into a respective condensing tube. The water vapor is condensed to provide potable water.

10 Claims, 9 Drawing Sheets

(56) References Cited

U.S. PATENT DOCUMENTS

| | | |
|---|---|---|
| 7,799,178 B2 | 9/2010 | Eddington |
| 7,954,322 B2 | 6/2011 | Henderson |
| 8,043,479 B2 | 10/2011 | Duesel, Jr. et al. |
| 8,157,984 B2 | 4/2012 | Jorge et al. |
| 2004/0084357 A1* | 5/2004 | Nagler .................. B01D 1/28 210/85 |
| 2006/0180460 A1* | 8/2006 | Nagler .................. B01D 1/28 202/234 |
| 2008/0017591 A1 | 1/2008 | Ranade et al. |
| 2008/0173590 A1 | 7/2008 | Duesel et al. |
| 2008/0174033 A1 | 7/2008 | Duesel et al. |
| 2010/0044206 A1 | 2/2010 | Shelley |
| 2011/0139600 A1 | 6/2011 | Al-Sadah et al. |

\* cited by examiner

SYSTEM AND METHOD OF DESALINATING SEAWATER

TECHNICAL FIELD

The present disclosure relates to a method and system of desalinating saline water.

BACKGROUND

Desalination refers to any of several processes that remove some amount of salt and other minerals from saline water. Saline water is desalinated to produce fresh water suitable for human consumption or irrigation. One potential byproduct of desalination is salt. Desalination is used on many seagoing ships and submarines. Most of the modern interest in desalination is focused on developing cost-effective ways of providing fresh water for human use. Along with recycled wastewater, this is one of the few rainfall-independent water sources.

SUMMARY

A water purification system is configured to operate in a body of water containing saline water. The water purification system includes a first tank, a subsequent tank, a first condensing tube, a subsequent condensing tube, and at least one condensation valve. The first tank and the subsequent tank are configured to be disposed within the body of water such that a top portion of each tank is above a water line of the body of water and a remainder of each tank is submerged beneath the water line of the body of water. The first tank and the subsequent tank each define a chamber, an inlet opening, an outlet opening, and a vent opening. The chamber is configured for holding a volume of fluid. The inlet and outlet openings are near a bottom portion of the tank. The bottom portion is disposed opposite the top portion. The vent opening is defined in the top portion of the tank. The first condensing tube fluidly extends between the vent opening of the first tank and the inlet opening of the subsequent tank. The first condensing tube is configured to receive desalinated water vapor from the vent opening of the first tank and condense the water vapor, creating a vacuum, which draws salinated water from the first tank to mix with the desalinated water formed from the vapor. Water, with reduced saline content, is then provided to the subsequent tank through the respective inlet opening. The subsequent condensing tube fluidly extends from the vent opening of the subsequent tank. The subsequent condensing tube is configured to receive water vapor from the vent opening of the subsequent tank and condense the water vapor, providing condensed potable water, as well as a vacuum that again draws water with reduced saline content from the second tank. The condensation valve is operatively disposed in each of the first and subsequent condensing tubes. The condensation valves are configured to move between an open position and a closed position. The chamber of each of the first and subsequent tanks is configured such that a pressure within the respective chamber increases as the respective condensation valve is in the closed position and water vapor within the respective chamber increases. The chamber of each of the first and subsequent tank is configured such that the pressure within the respective chamber decreases as the respective condensation valve is in the open position and the water vapor exits the chamber under pressure and enters the respective condensing tube. Once the vapor exits the valve closes allowing the condensing water within the condensing tube to form a vacuum that then draws water from the previous tank via its outlet valve.

In another aspect of the disclosure, the water purification system includes at least one sensor and a controller. The sensor is configured to be operatively connected to the chamber of each of the tanks. The sensor is configured to sense a value within at least one of the chambers. The controller is operatively connected to the sensor and the condensation valves. The controller is configured to send a signal to move the condensation valves to a desired one of the open position and the closed position. The chamber of each of the first and subsequent tank is configured such that a pressure within the respective chamber increases as the respective condensation valve is in the closed position and water vapor within the respective chamber increases. The chamber of each of the first and subsequent tank is configured such that the pressure within the respective chamber decreases as the respective condensation valve is in the open position such that the water vapor exits the chamber under pressure and enters the respective condensing tube.

In yet another aspect of the disclosure, a method of desalinating saline water from a body of water is provided. The method includes filling chambers of a plurality of tanks with a volume of saline water. The saline water is heated to increase a pressure and produce water vapor within the chamber of each tank. A condensation valve is moved to an open position such that the water vapor is released into a respective condensing tube. The water vapor is condensed to provide potable water and a vacuum that then draws salinated water from the previous tank and mixes the salinated water with the condensed water vapor. As the water moves from tank to tank, each subsequent tank sequentially contains less saline, with the final tanks eventually containing totally desalinated potable water.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
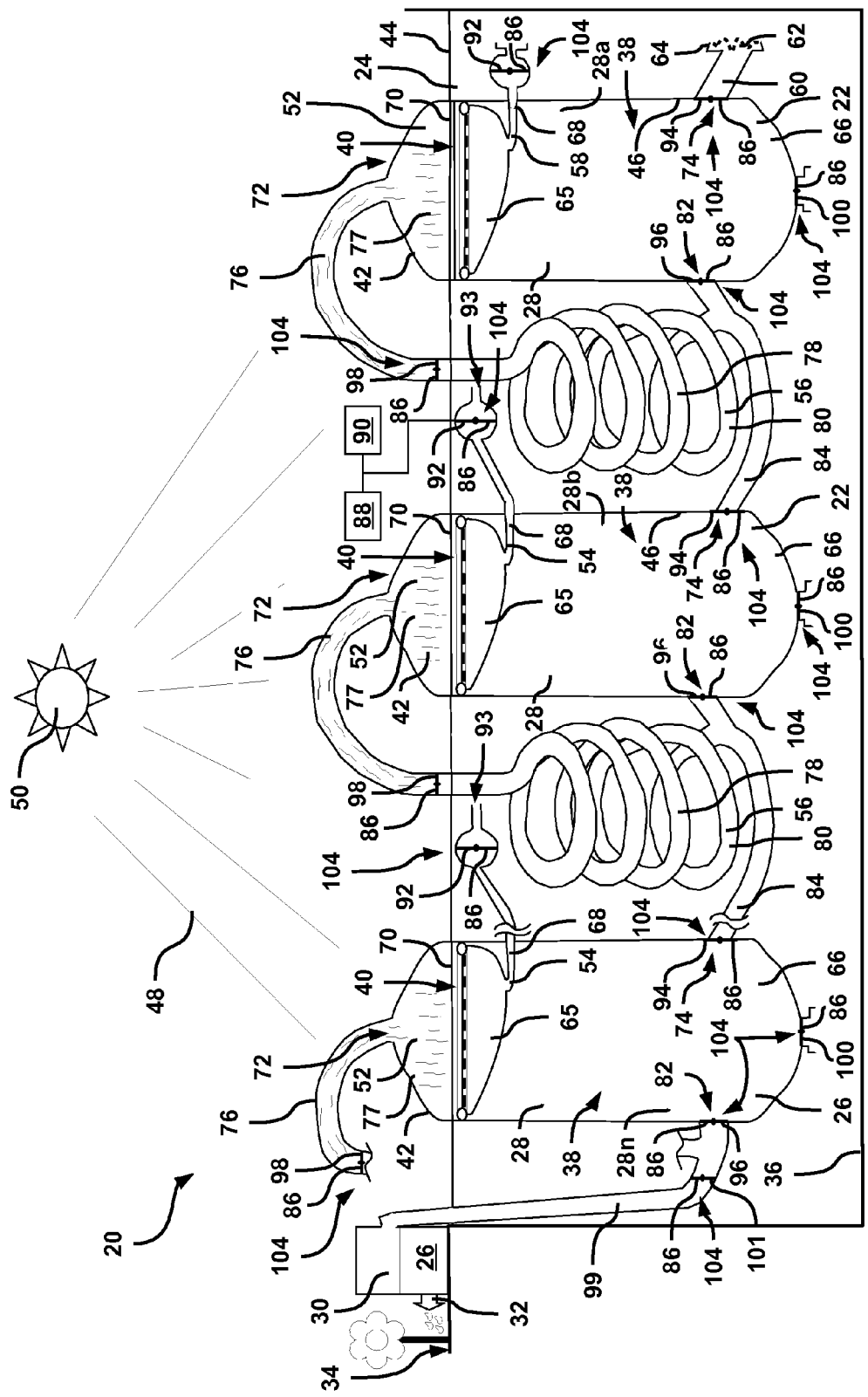
FIG. 1 is a schematic diagrammatic side view of a purification system in a body of water.

Referring to the Figures, wherein like numerals indicate like parts throughout the several views, a purification system 20 is shown at in FIGS. 1-6. The purification system 20 is configured to desalinate saline water 22 from a body of water 24, so as to provide freshwater 26. Saline water 22 may include saline water, brackish water or briny water, and the like. Saline water 22 contains dissolved salts. As such, the purification system 20 operates to desalinate the saline water 22 into drinkable freshwater 26, i.e., potable water 26. As such, the salt and any organisms may be removed from the saline water 22 to provide freshwater 26. Potable water 26 is safe enough to be consumed by humans and/or used for non-potable purposes, including, but not limited to, landscape irrigation, toilet flushing, washing, and the like. The body of water 24 may be an ocean, lake, lagoon, river, swamp, bayou, and the like.

The purification system 20 includes a plurality of tanks 28 arranged in serial fluid communication with one another. More specifically, the tanks 28 may be arranged such that a first tank 28a is in fluid communication with a second tank 28b, and so on, until an nth tank 28n is reached. The nth tank 28n is the last tank 28n. The tanks 28a, 28b, and 28n will be generally referred to as 28, unless indicated otherwise. In one non-limiting example, there are at least 30 tanks 28 arranged in serial fluid communication with one another. However, it should be appreciated that there may be any desired number of tanks 28. By way of a non-limiting example, there may be at least 30 tanks 28. A reservoir 30 is in fluid communication with the nth tank 28. The reservoir 30 is configured to store the potable water 26. The tank 28 may include a spigot 32 or other type of valve that is configured to draw the potable water 26 from the reservoir 30 for consumption or use.

The tanks 28 are at least partially disposed within the body of water 24 and the reservoir 30 may be disposed on a surface 34, external to the body of water 24. By way of a non-limiting example, the reservoir 30 may be disposed on dry land, adjacent the body of water 24, such that the potable water 26 is directed from the last tank 28n to the reservoir 30 for consumption. The tanks 28 may be operatively supported by a floor 36 of the body of water 24, buoys, and the like. Each tank 28 defines a chamber 38 configured for holding a volume of fluid 40. The tanks 28 are disposed within the body of water 24 such that a top portion 42 of each tank 28 is above a water line 44 of the body of water 24 and a remainder 46 of each tank 28 is submerged beneath the water line 44 of the body of water 24. The top portion 42 of each tank 28 is exposed to atmosphere and is made of glass. As such, rays 48 of the sun 50 are absorbed into the top portion 42 of each tank 28 to heat the fluid within the respective tanks 28 via the greenhouse effect. The fluid contained within each tank 28 may be a combination of saline water 22 and air 52. As discussed above, the water may be salinated water 22, potable water 26, or combinations thereof. In one non-limiting example, the top portion 42 may be formed from glass and the remainder of the tank 28 may be formed from steel. It should be appreciated that the tanks 28 may be formed from other materials as well.

With continued reference to FIGS. 1-6, each tank 28 is fluidly connected to a next subsequent tank 28 via a condensing tube 56. Further, the first tank 28a includes an inlet purge line 58 and an inlet intake line 60 that are each in fluid communication with the body of water 24. The inlet intake line 60 is configured to intake water into the chamber 38 of the first tank 28a, from the body of water 24. A filter 62 and/or a decontamination device 64 may be operatively disposed on the inlet intake line 60. The filter 62 is configured to prevent any objects, such as fish, seaweed, and the like from entering the chamber 38 from the body of water 24. The decontamination device 64 may be configured to kill any organisms, such as bacteria, parasites, fungus, viruses, and the like, contained in the incoming saline water 22 to prevent contamination within the chamber 38. Likewise, the inlet purge line 58 is configured to exhaust water from the chamber 38 of the first tank 28a, into the body of water 24.

Further, each tank 28 includes an evaporating dish 65 disposed within the chamber 38 of the respective tank 28, as shown in FIGS. 1-6, 9, and 10. A purge line 54 fluidly extends from the respective evaporating dish 65. The purge lines 54 exit the chamber 38 and extend to a purge outlet 93. A purge valve 92 is operatively disposed in the purge line 54, between the evaporating dish 65 and the purge outlet 93 such that the salinated water 22 within the evaporating dish 65 may be selectively exhausted into the body of water 24. Likewise, the purge valve 92 is operatively disposed in the inlet purge line 58, between the evaporating dish 65 and the body of water 24. In one embodiment, the purge lines 54 may be made of flexible tubing 68 such that the evaporating dish 65, attached to the respective purge line 54, floats at or proximate a fill level 70 of the water within the chamber 38. The level of the water within each chamber 38 may be the demarcation between the water and the air 52 within each chamber 38. As will be explained in more detail below, when the salt concentration of the salinated water 22 becomes too concentrated, the purge line 54 may be configured to allow the water to flow from the chamber 38, into the body of water 24, to reduce the salt concentration.

With reference to FIGS. 1-6, 9, and 10, the evaporating dish 65 may have a generally funnel shaped cross-section which presents a diameter that tapers between an upper portion 67 and a lower portion 69. The upper portion 67 is at or near the fill level 70 and the lower portion 69 is between the upper portion 67 of the evaporating dish 65 and the bottom portion 66 of the tank 28. The purge line 54 extends from the lower portion 69 of the evaporating dish 65. A float 73 surrounds the upper portion 67 of the evaporating dish 65 such that the evaporating dish 65 floats at or near the fill level 70. A plurality of openings 71 are defined in the evaporating dish 65, proximate the upper portion 67. More specifically, the evaporating dish 65 is configured to receive a portion of the salinated water 22 therein, through the openings. The salinated water 22 within the evaporating dish 65 evaporates, increasing the saline content of the water in the evaporating dish 65. When the saline content is sensed to be too great, the purge valve 92 is opened such that the highly salinated water 22 is drained/forced from the evaporating dish 65 by the pressure build up of the water vapor 77.

Figure 11:
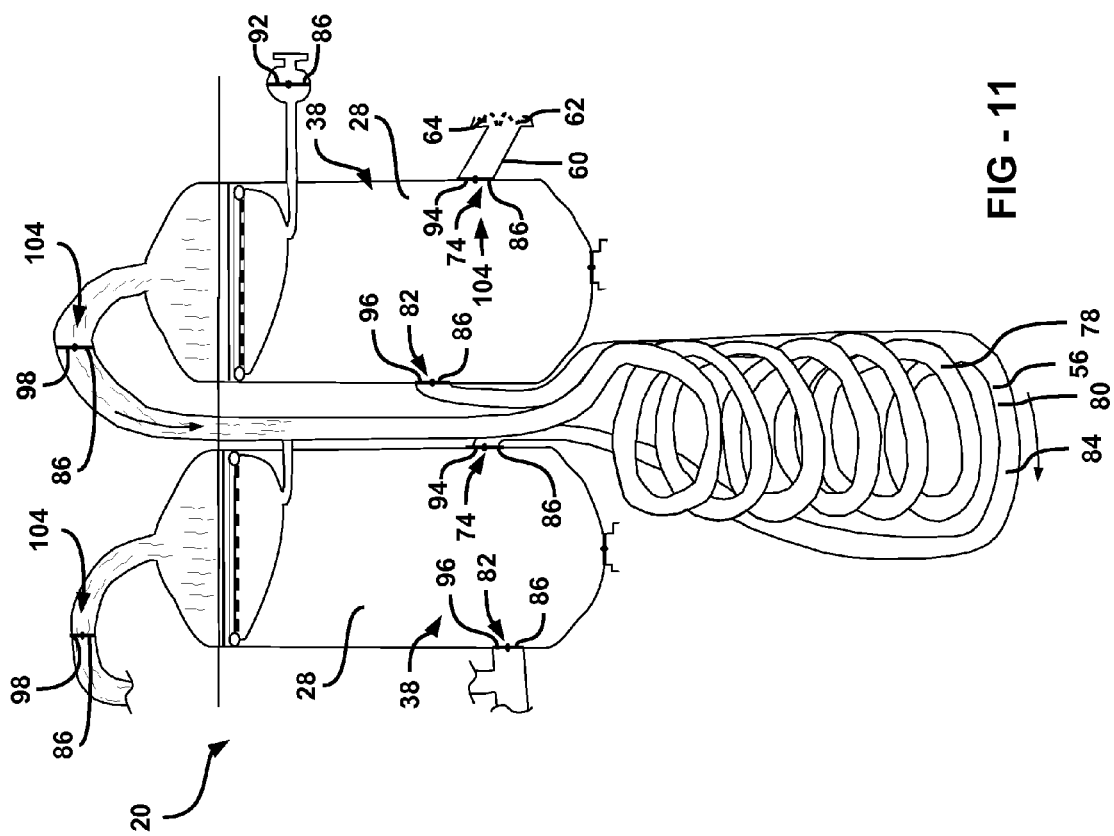
FIG. 11 is a schematic diagrammatic side view of the purification system.

The top portion 42 of each tank 28 defines a vent opening 72. Each tank 28 also defines an inlet opening 74 and an outlet opening 82, near a bottom portion 66. Each condensing tube 56 extends between the vent opening 72 of the preceding tank 28a, and the inlet opening 74 of the subsequent tank 28b, 28n. By way of a non-limiting example, FIGS. 1-6 illustrate a first condensing tube 56 extending from a vent opening 72, defined in the top portion 42 of the first tank 28a, and extending to the inlet opening 74, defined near the bottom portion 66 of the second tank 28b. Water vapor 77 may enter a collection section 76 of the respective condensing tube 56 via the vent valve 86. Each condensing tube 56 includes a condensing section 78 that fluidly extends from the collection section 76. The condensing section 78 may be submerged within the body of water 24 to facilitate heat transfer between the water vapor 77 from the preceding tank 28 and the body of water 24. The heat transfer will operate to condense the water vapor 77 throughout the condensing section 78 and provide potable water 26, as well as create a vacuum within the condensing tube. The vacuum then draws salinated water from the previous tank, which mixes with the desalinated potable water to produce salinated water with a reduced salt content, as compared to the previous tank. The water with reduced saline content 26 flows from the condensing tube 56 into the subsequent tank 28, via the subsequent inlet opening 74. The condensing section 78 of the condensing tube 56 may be formed as a spiral 80 to increase the surface 34 area of the heat transfer during condensing. With reference to FIG. 11, the condensing tuber 56 may be disposed such that the condensing section 78 may be disposed beneath the bottom portion 66 of the tanks 28 such that the tanks 28 may be disposed in closer relationship to one another. This provides a more compact arrangement of the tanks 28 to save space in the body of water 24 as well as provides cooler water for more complete condensation.

Additionally, each tank 28 defines an outlet opening 82 near the bottom portion 66 of the tank 28. Each condensing tube 56 includes a flow section 84 that fluidly extends between the outlet opening 82 of the preceding tank 28a, 28b and the inlet opening 74 of the subsequent tank 28b, 28n. The condensing section 78 fluidly extends between the collection section 76 and the flow section 84. The inlet opening 74 into the subsequent tank 28 and the outlet opening 82 from the preceding tank 28 are each disposed below the condensing section 78 of the respective condensing tube 56, i.e., between the floor 36 of the body of water 24 and the condensing section 78. As such, saline water 22 from the preceding tank 28 may enter the flow section 84 of the condensing tube 56 to mix with the condensed water vapor and then flow into the subsequent tank 28 via the outlet, thereby providing each subsequent tank with water containing less saline.

With continued reference to FIGS. 1-6, in order to control the flow of water between the tanks 28 and the reservoir 30, the purification system 20 includes a plurality of flow control valves 86, at least one sensor 88, and a controller 90. While FIGS. 1-6 illustrate only one sensor 88, it should be appreciated that any desired number of sensors 88 may be used. The flow control valves 86 and the sensor(s) 88 are operatively connected to the controller 90. The flow control valves 86 may include purge valves 92, an intake valve 94, outlet valves 96, intake valves 94, condensation valves 98, sediment valves 100, and a fresh water supply valve 101. Each flow control valve 86 is configured to independently move between an open position 102 and a closed position 104. The sensor 88 may be one sensor 88 or a plurality of sensors 88 that are operatively connected to the controller 90 and at least one of the tanks 28. The sensors 88 are configured to sense a value within each chamber 38 including, but not limited to, an air pressure, a fill level 70, a saline level of the water, a temperature, and the like. Each sensor 88 is configured to sense at least one value or attribute of the purification system 20 and provide the value(s) to the controller 90. As will be explained in more detail below, the controller 90 is configured to selectively send one or more signals to move any one of the flow control valves 86 to the desired position, as a function of the sensed value. The flow control valves 86, the sensor 88, and/or the controller 90 may be electrically powered via solar energy, wind energy, battery energy, and the like. The controller 90 and the sensors 88 are illustrated in highly schematic fashion. The controller 90 may perform real-time detection, diagnostic, and calculation functions for the purification system 20.

The controller 90 may include one or more components with a storage medium and a suitable amount of programmable memory, which are capable of storing and executing one or more algorithms or methods to effect control of the purification system 20. Each component of the controller 90 may include distributed controller 90 architecture. Additional modules or processors may be present within the controller 90.

A purge valve 92 is operatively disposed along each of the purge lines 54. Each purge valve 92 is configured to move between a closed position 104, as illustrated in FIGS. 1-3, 5, and 6, and an open position 102 as illustrated in FIG. 4. In the open position 102, water is permitted to flow from the chamber 38 of the respective tank 28, past the purge valve 92, and into the body of water 24, via a purge outlet 93. Likewise, in the closed position 104, the purge valves 92 prevent water from flowing from the chamber 38, through the purge line 54.

An intake valve 94 is operatively disposed at the inlet opening 74 to each tank 28. The intake valves 94 are configured to move between a closed position 104, illustrated in FIGS. 1, 2, and 4-6, and an open position 102, illustrated in FIG. 3. In the open position 102, water is permitted to flow from the body of water 24 and into the first tank 28a and from the connecting tube 84 of the preceding condensation tube 56. Likewise, in the closed position 104, the intake valves 94 prevent water from flowing into the first tank 28a, via from the body of water 24, and into subsequent tanks 28b, 28n from the connecting tube 84 of the preceding condensation tube 56.

An outlet valve 96 is operatively disposed at the outlet opening 82 for each tank 28. The nth tank 28 includes the outlet opening 82 and the outlet valve 96. In the embodiment shown in FIGS. 1-6, the nth tank 28 includes the outlet opening 82 and the outlet valve 96. Each outlet valve 96 is configured to move between a closed position 104, illustrated in FIGS. 1, 2, and 4-6, and an open position 102, illustrated in FIG. 3. In the open position 102, water is permitted to flow from the tank 28, through the outlet opening 82, past the outlet valve 96, and into the condensing tube 56. Likewise, in the closed position 104, the outlet valve 96 prevents water from flowing through the outlet opening 82, into the respective condensing tube 56.

A condensation valve 98 is operatively disposed along each of the condensing tubes 56 such that the condensation valve 98 is disposed at or above the water line 44 of the body of water 24. Each condensation valve 98 is movable between a closed position 104, illustrated in FIGS. 1 and 3-6, and an open position 102, illustrated in FIG. 2. In the open position 102, vapor 77, under pressure, is permitted to flow from the preceding tank 28, past the condensation valve 98, into the condensing section 78. Ultimately, the water flows from the condensing section 78 and into the subsequent tank 28. Likewise, in the closed position 104, the condensation valve 98 prevents vapor 77 and/or water from flowing from the preceding tank 28 and into the condensing section 78 of the condensing tube 56, allowing the vapor pressure to build up.

A sediment valve 100 is operatively disposed proximate a bottom of each tank 28. The sediment valve 100 is configured to move between a closed position 104, illustrated in FIGS. 1-5, and an open position 102, illustrated in FIG. 6. In the open position 102, saline water and sediment 22 are permitted to flow past the sediment valve 100, into the body of water 24. This allows any sediment and/or the brine water to exit the tank 28 and the purification system 20. In the closed position 104, the sediment valve 100 prevents water from exiting the tank 28 to the body of water 24.

The operation of the purification system 20 to produce potable water 26 will now be explained, with reference to FIGS. 1-6. Upon installation, the purification system 20 may be initialized by opening the intake valve 94 of the first tank 28a and inlet and outlet valves 94, 96 for each tank 28a, 28b, 28n. As such, the saline water 22 flows from the body of water 24, into the first tank 28a. The saline water 22 continues to flow from the first tank 28a and into all of the remaining tanks 28 via the condensing tubes 56 and connecting tubes 84. The intake valve 94 and the inlet and outlet valves 94, 96 remain in the open position 102 until all of the tanks 28 and portions 42, 66 of the condensing tubes 56 are initially filled with the saline water 22 from the body of water 24. More specifically, each tank 28 and condensing tube 56 is filled with water 22 such that the internal water level of each tank 28 and the internal water level of each condensing tube 56 are no higher than the water line 44 of the body of water 24, external thereto. This allows each tank 28 to contain a combination of water 22 and air 52 to allow vaporization of the water 22 within each tank 28a, 28b, 28n. Further, it should be appreciated that the purification system 20 is only initialized with seawater, i.e., saline water 22. As the purification system 20 operates, the saline level of each subsequent tank 28b, 28n is eventually reduced until potable water 26 is achieved in at least the last tank 28n. If should be appreciated that through this serial desalination, the last several tanks 28 may contain potable water 26.

Referring now to FIG. 1, each tank 28 is illustrated as being filled with water and each of the flow control valves 86 are in the respective closed position 104. Solar radiation from the sun 50 contacts and heats the top portion 42 of each tank 28, via the greenhouse effect, causing the water in each evaporating dish 65 to become heated. As the water in each evaporating dish 65 is heated, vapor 77 forms therein. Since all of the flow control valves 86 are in the closed position 104, an air/vapor pressure within the chamber 38 of each tank 28 also increases.

Figure 2:
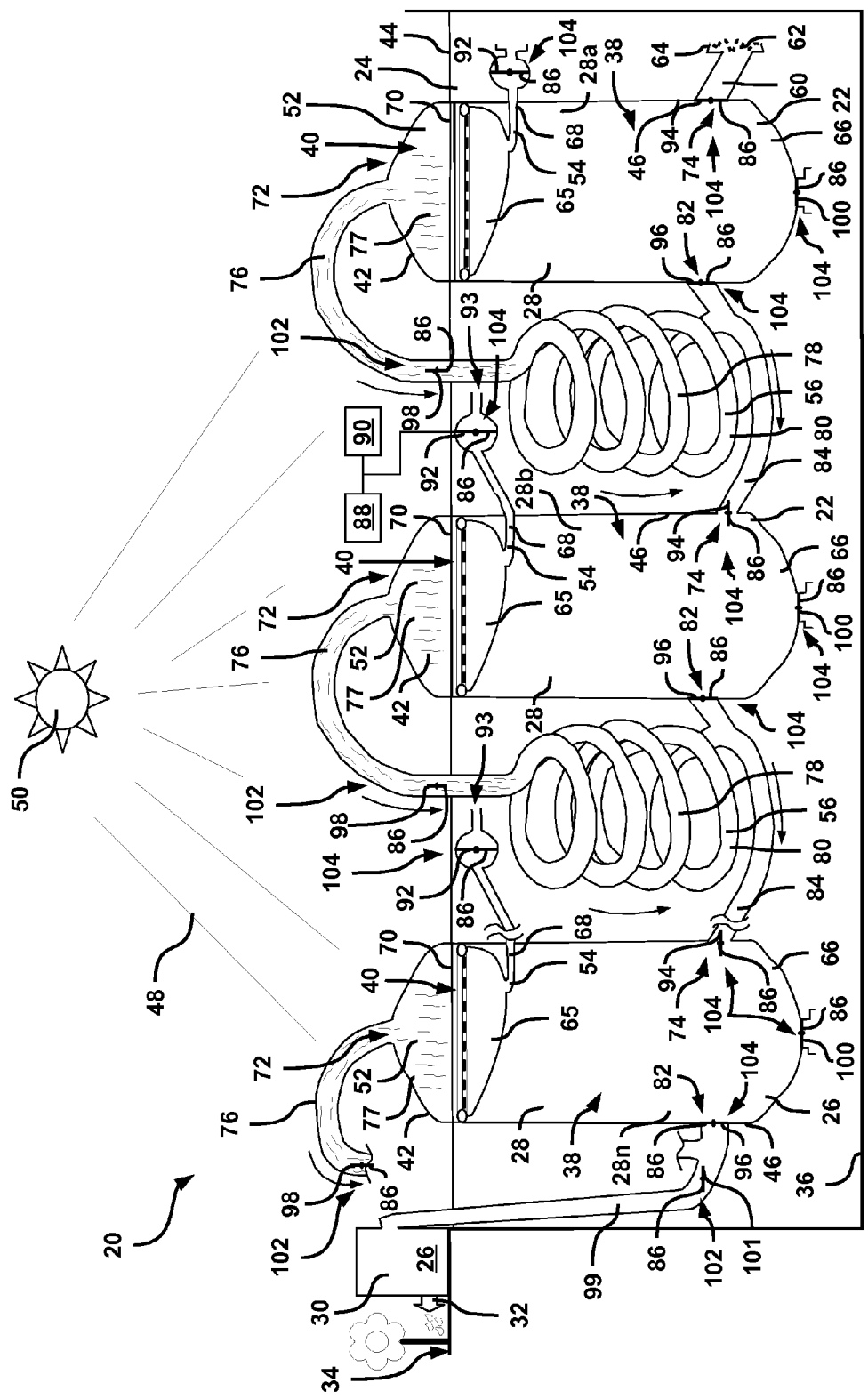
FIG. 2 is a schematic diagrammatic side view of the purification system in the body of water.

The air pressure within each tank 28 continues to increases due to the vaporization of the water 22. Once the air pressure reaches a predetermined threshold, the controller 90 signals the corresponding condensation valves 98, intake valves 94, and the supply valve 101 to move to the open position 102, as illustrated in FIG. 2. When the condensation valve 98 is in the open position 102, the remaining control valves 86, 92, 96, 100 remain in the closed position 104. Once the condensation valves 98, intake valves 94, and supply valve 101 are in the open position 102, the vapor pressure is released from the chamber 38 of the preceding tank 28a, 28b, 28n, where the vapor 77 enters the collection section 76 of the condensing tube 56. The vapor 77 flows past the condensation valve 98 and enters the respective condensing section 78. The vapor 77 forces the water in the condensing tube through the inlet of the subsequent tank 74 or out into the reservoir 30. The condensation valves 98, intake valves 94, and the supply valve 101 then quickly close. The vapor 77 condenses inside the condensing section 76 to become desalinated potable water 26 and, at the same time, forming a vacuum within the condensing section 78.

Figure 3:
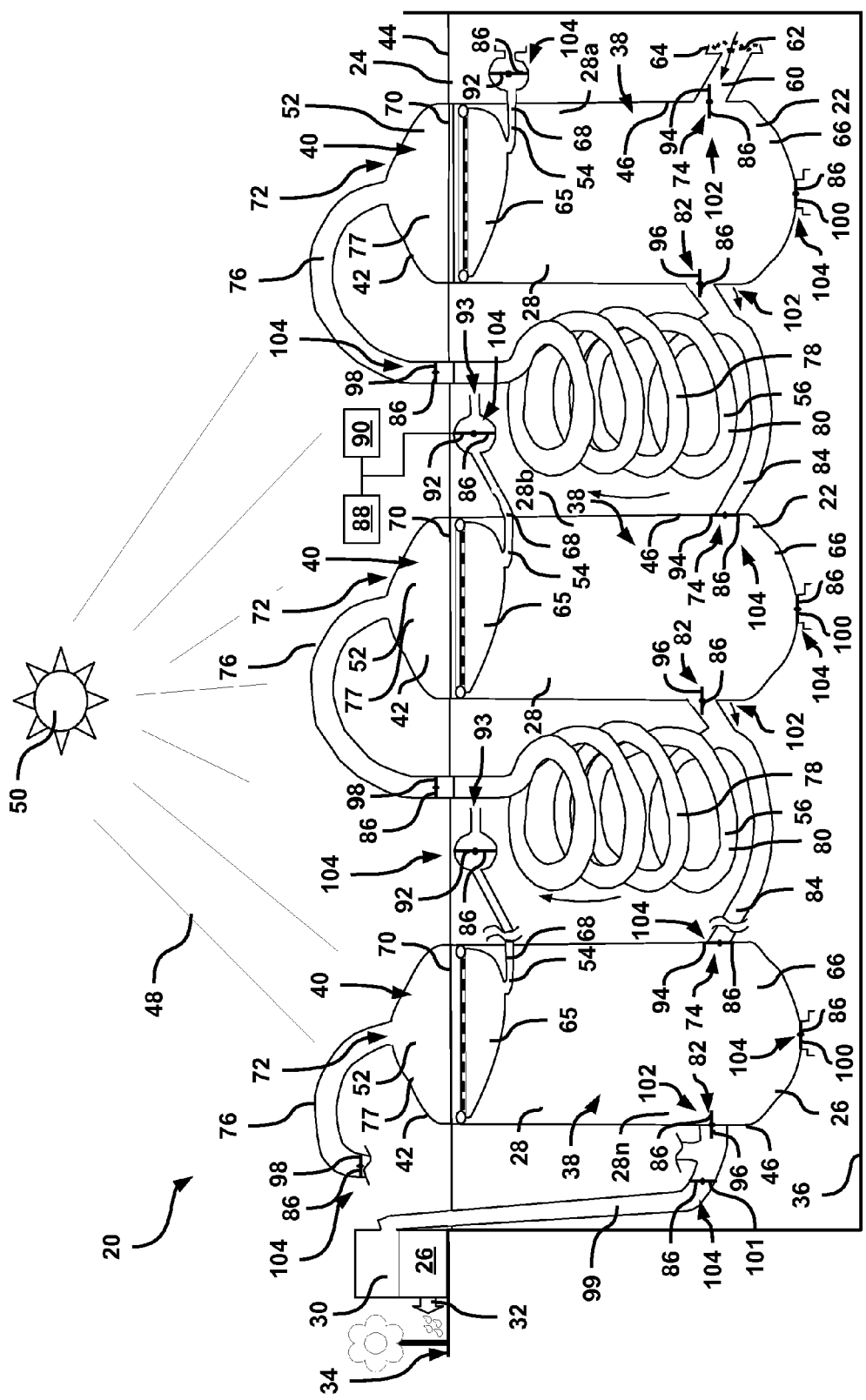
FIG. 3 is a schematic diagrammatic side view of the purification system in the body of water.
Figure 4:
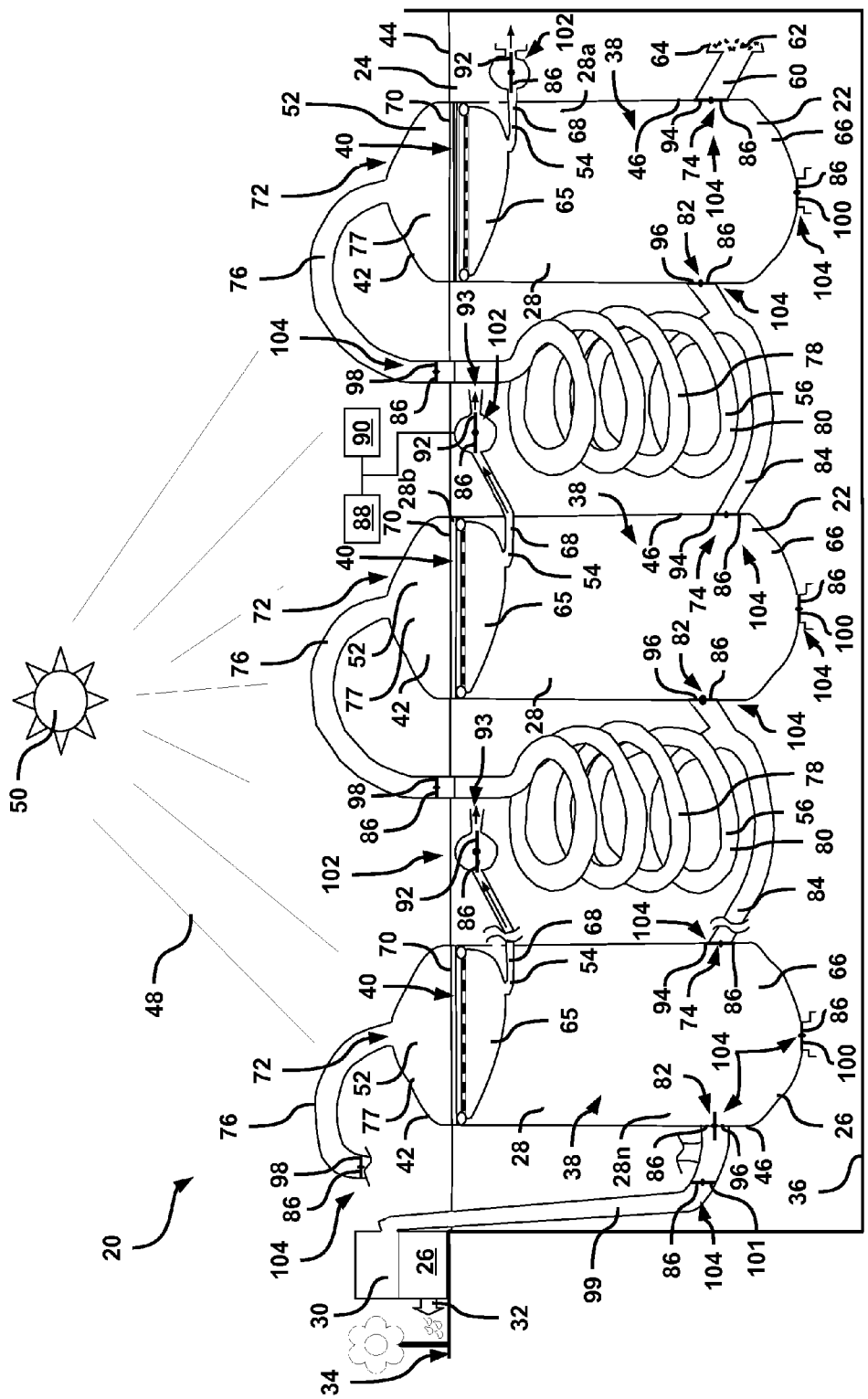
FIG. 4 is a schematic diagrammatic side view of the purification system in the body of water.

Referring to FIG. 3, with the condensation valve 98 and intake valve 94 closed, the water vapor 77 condenses, forming a vacuum within the condensing tube 56. The pressure between the tanks 28 is equalized by moving the outlet valves 96 and the intake valve 94 to the open positions 102. The purge valves 92 and the exhaust valves 100 remain in the closed position 104. The vacuum draws the saline water 22 from the body of water 24, into the first tank 28a, via the intake valve 94. The vacuum continues to draw the water through the outlet opening 82 of the first tank 28a, into the condensing tubes 56 where again a vacuum has been created. Each subsequent tank empties water into each subsequent condensing tube 56 again by the vacuum created in each condensing tube 56. The water 22 ultimately backfills the condensing section 78 of the condensing tubes 56, until the water 22 is stopped by the closed condensation valve 98 or the pressure is equalized. The saline water 22 flows from the body of water 24 until the air pressure within the tanks 28 is equalized.

Once the pressure within the tanks 28 is equalized, the intake valve 94 and the outlet valves 96 are moved to the closed position 104. Next, with the control valves 86, 92, 94, 96, 98, 100, 101 in the respective closed position 104, the air 52 pressure within each tank 28 continues to build. The sensor(s) 88 may sense that the air 52 pressure is sufficient to open the condensation valve 98 and release the vapor 77 from the tanks 28 under pressure, as described above with respect to FIG. 2. Alternatively, the sensor 88 may sense that the saline level of the water 22 is above a predetermined threshold. If the saline level is sensed to be above the predetermined threshold, the controller 90 may signal the purge valves 92 to move to the open position 102, as illustrated in FIG. 4. Once the purge valves 92 are in the open position 102, at least a portion of the salinated water 22 within the chamber 38 is exhausted through the purge line 54, under pressure, into the body of water 24. As described above, since the purge line 54 is configured to be disposed at or near the level of the water 22 within the chamber 38 that has the highest concentration of salts, the purging illustrated in FIG. 4 causes a greater volume of the saline water 22 to be purged. As a result, the saline level of the water 22 within each tank 28 is reduced. The purging may also occur at predetermined intervals, e.g., after the tanks cycle a predetermined number of times, after a certain amount of time has passed, etc.

Figure 5:
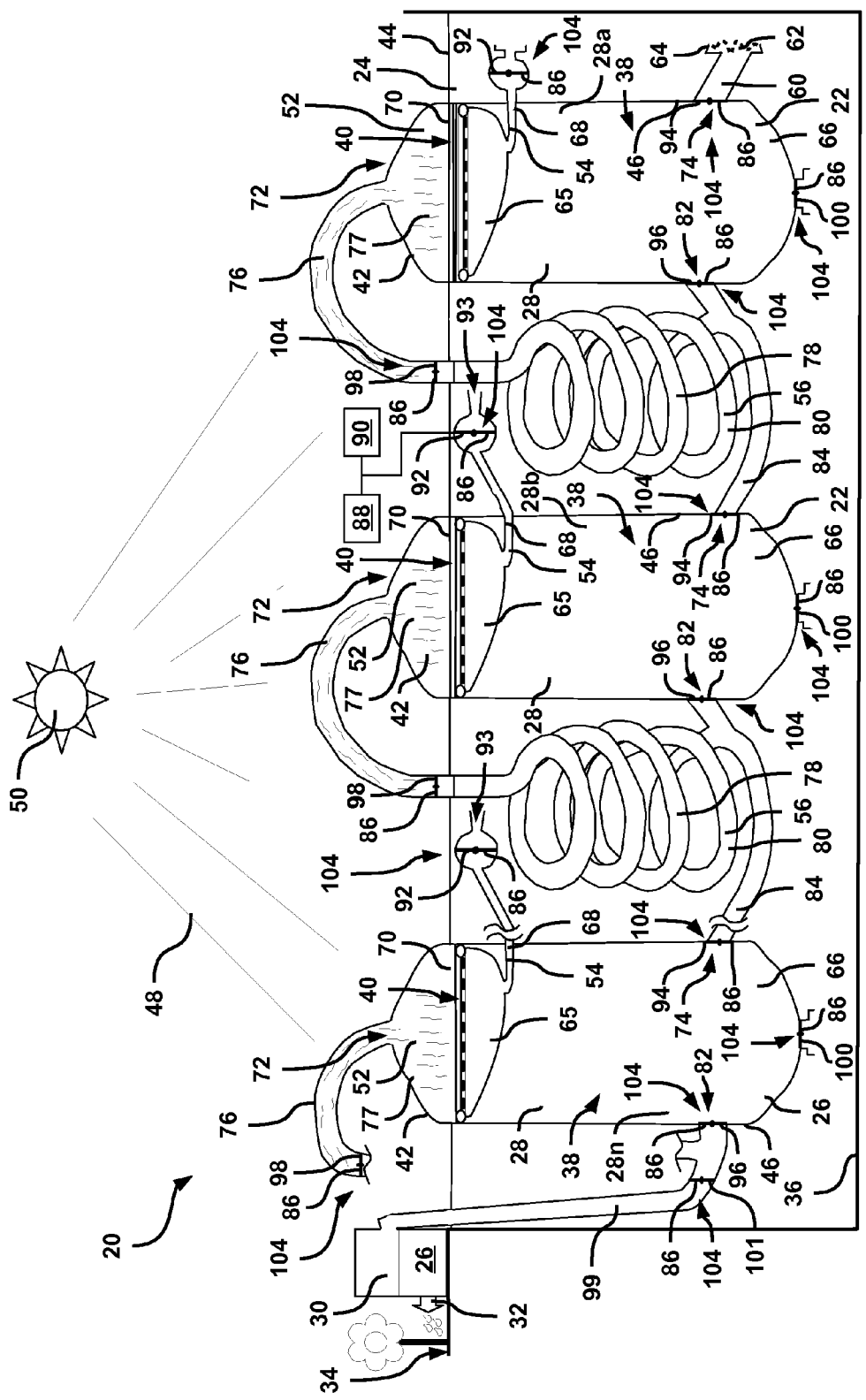
FIG. 5 is a schematic diagrammatic side view of the purification system in the body of water.

After a portion of the concentrated saline water 22 is purged from the tanks 28, FIG. 5 illustrates the control valves 86, 92, 94, 96, 98, 100, 101 being in the respective closed position 104, such that the water within the evaporation dish 65 is heated by solar radiation. As described previously, rays 48 from the sun 50 contact the top portion 42 of each tank 28, causing the water 22 in each tank 28 to become heated. As the water in each tank 28 is heated, vapor 77 forms therein. Since all of the flow control valves 86 are in the closed position 104, the air/vapor 52 pressure within the chamber 38 of each tank 28 also increases. Once the sensor 88 senses that the air 52 pressure within each tank 28 has reached the predetermined threshold, the controller 90 signals to move the condensation valves 98 to the open position 102, as illustrated in FIG. 2 and described above. As such, the cycle illustrated in FIGS. 2-5 repeats by returning the purification system 20 to the conditions shown in FIG. 2 and proceeding sequentially through the conditions illustrated in FIGS. 3-5.

Figure 6:
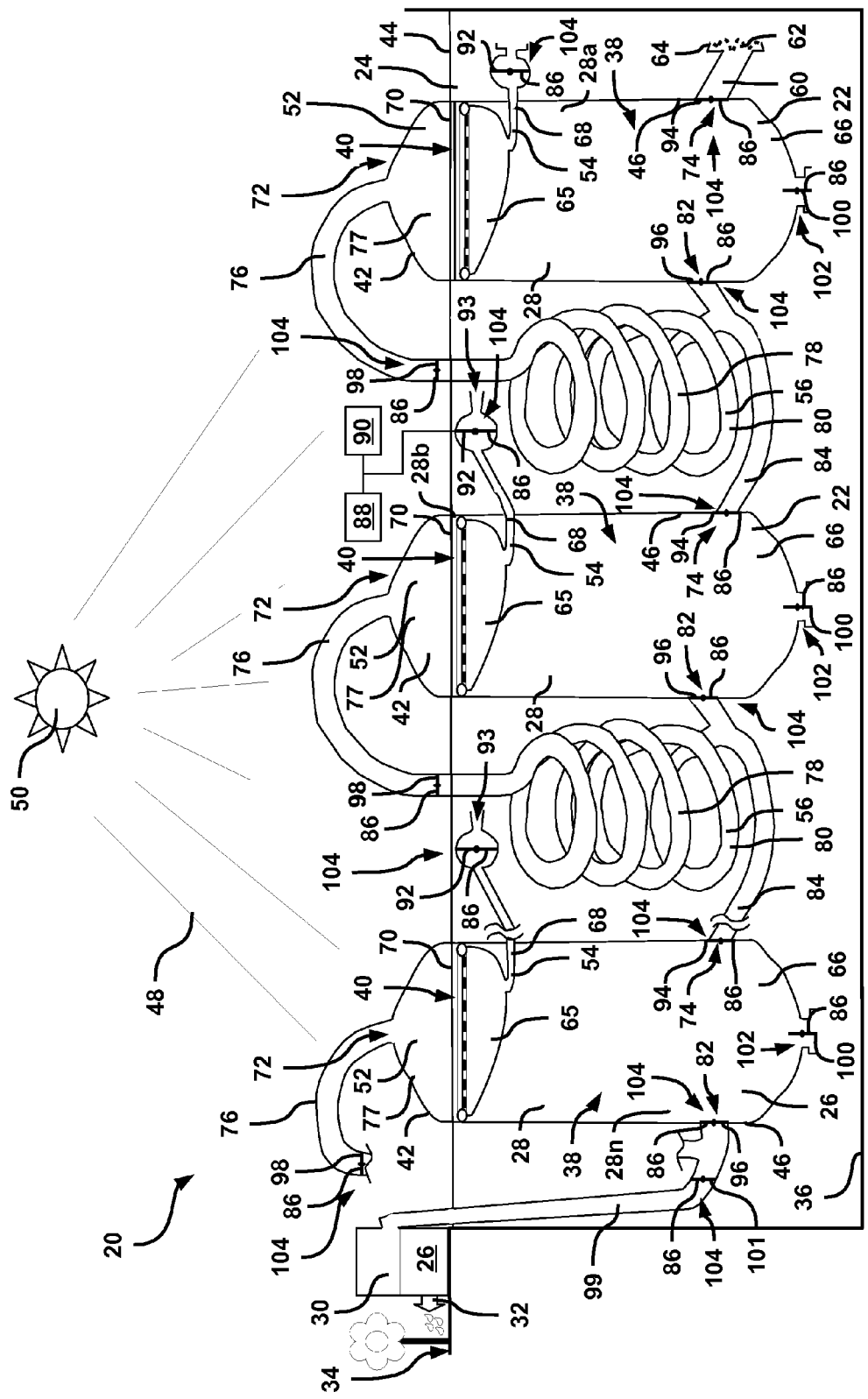
FIG. 6 is a schematic diagrammatic side view of the purification system in the body of water.

When sediment at the bottom of the system 20 becomes too great, the sediment valves 100, defined at or near a bottom of the tanks 28, may be moved to the open position 102, as illustrated in FIG. 6. The sediment within each tank 28 flows into the body of water 24, through the respective sediment valves 100. The purification system 20 may be configured such that the sediment valves 100 are configured to open at specific times, specific intervals, and/or based on a measured value of the water within the purification system 20. Once the sediment is purged from the chambers 38 of the tanks 28, the system 20 may be returned to the conditions illustrated in FIG. 1, where the cycle repeats by proceeding sequentially through the conditions illustrated in FIGS. 2-6.

Figure 7:
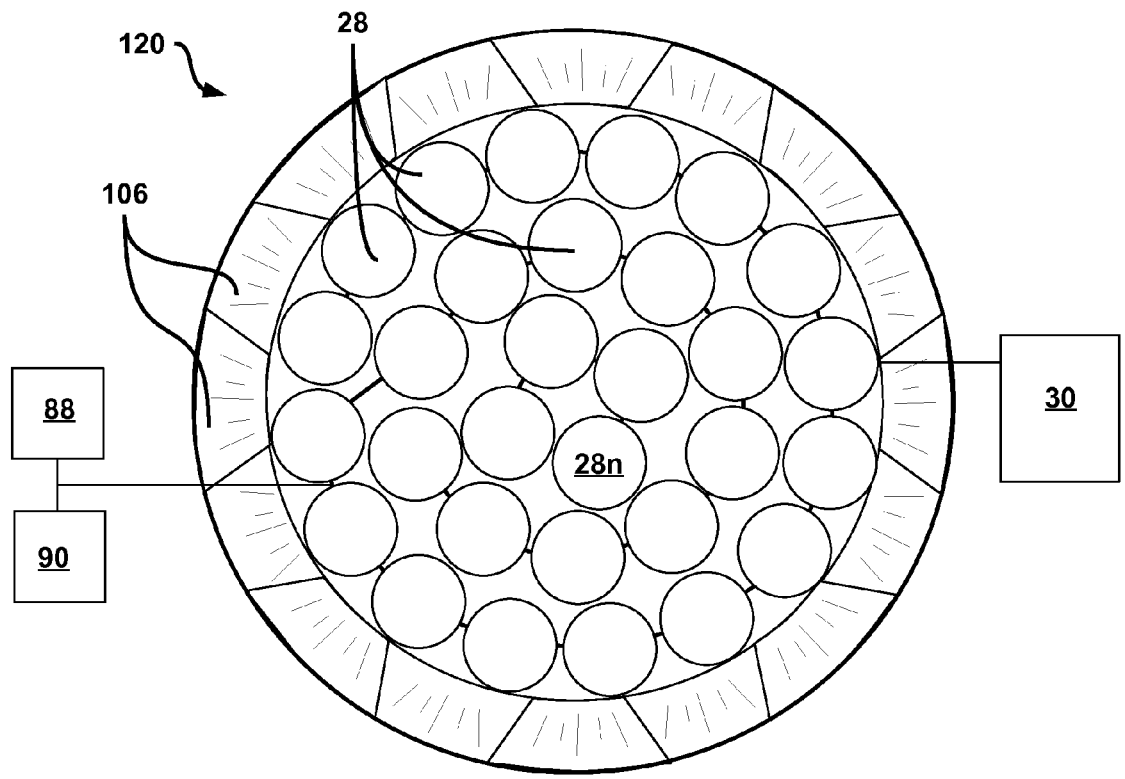
FIG. 7 is a schematic diagrammatic plan view of the purification system with a plurality of tanks arranged in a circular pattern and having a plurality of reflecting shields surrounding the tanks.

Referring now to FIG. 7, a plan view of one embodiment of an arrangement of the tanks 28 of a purification system 120 is shown. In this arrangement, 30 tanks 28 may be positioned in a circular arrangement. This circular arrangement maximizes the area taken up by the tanks 28 within the body of water 24. The tanks 28 may be tethered to one another such that the tanks 28 remain in the circular arrangement.

Figure 8:
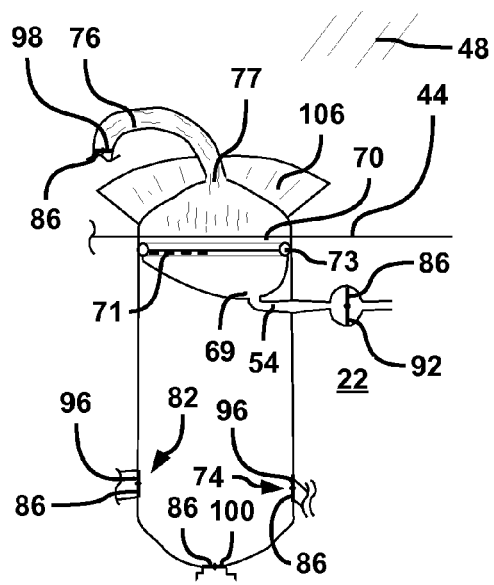
FIG. 8 is a schematic diagrammatic side view of the purification system in the body of water with a reflecting shield surrounding one of the tanks.
Figure 9:
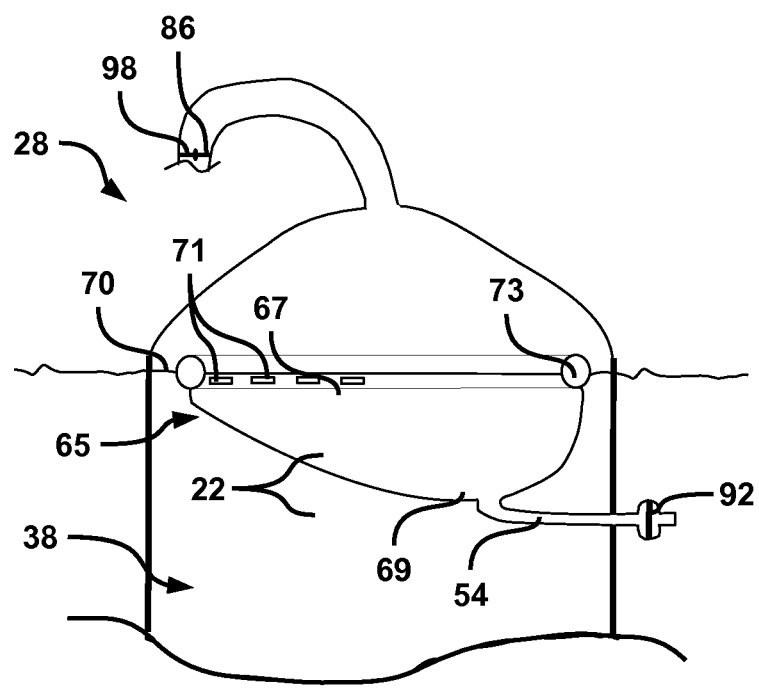
FIG. 9 is a schematic diagrammatic partial side view of a tank of the purification system with an evaporating dish disposed within the tank.
Figure 10:
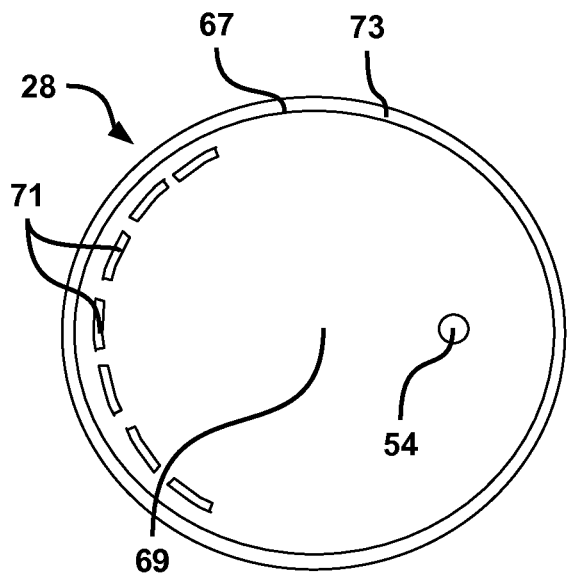
FIG. 10 is a schematic top view of the evaporating dish of FIG. 9.

Further, with reference to FIGS. 7 and 8, one or more reflecting shields 106 may be disposed around the tanks 28. The reflecting shields 106 are configured to reflect the rays 48 of the sun 50 onto the tanks 28, thus increasing the heat within each evaporating chamber 38. Increasing the heat within each tank 28 will cause the purification system 120 to produce potable water 26. In one embodiment, illustrated in FIG. 7, the reflecting shields 106 are arranged to surround a perimeter of the purification system 20, thus directing the reflected rays 48 of the sun 50 inwardly from the perimeter. In another embodiment, illustrated in FIG. 8, at least one reflecting shield 106 surrounds each tank 28 to reflect the rays 48 of the sun 50 toward the respective tank 28.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A water purification system configured to operate in a body of water containing saline water, the water purification system comprising:
   a first tank and a subsequent tank configured to be disposed within the body of water such that a top portion of each tank is above a water line of the body of water and a remainder of each tank is submerged beneath the water line of the body of water;
   wherein the first tank and the subsequent tank each define:
      a chamber configured for holding a volume of fluid;
      an inlet opening near a bottom portion, wherein the bottom portion is disposed opposite the top portion; and
      a vent opening defined in the top portion;
   a first condensing tube fluidly extending between the vent opening of the first tank and the inlet opening of the subsequent tank;
   wherein the first condensing tube is configured to receive desalinated water vapor from the vent opening of the first tank and condense the water vapor such that a vacuum is created to draw salinated water from the first tank to mix with the desalinated water vapor, whereby condensed potable water is provided to the subsequent tank through the respective inlet opening;
   wherein the first condensing tube includes a condensing section extending between the inlet opening of the subsequent tank and the collection section and configured to condense the water vapor received in the respective collection section such that condensed potable water is provided to the subsequent tank through the respective inlet opening;
   a subsequent condensing tube fluidly extending from the vent opening of the subsequent tank;
   wherein the subsequent condensing tube is configured to receive water vapor from the vent opening of the subsequent tank such that a vacuum is created to draw salinated water from the subsequent tank to mix with the desalinated water vapor, whereby condensed potable water is provided;
   wherein the first and subsequent condensing tube each include a collection section extending from the respective vent opening;
   wherein the collection section is configured to receive the water vapor from the respective first and subsequent tank;
   a condensation valve operatively disposed in each of the first and subsequent condensing tubes;
   wherein each condensation valve is configured to move between an open position and a closed position;
   wherein the chamber of each of the first and subsequent tank is configured such that a pressure within the respective chamber increases as the respective condensation valve is in the closed position and water vapor within the respective chamber increases;
   wherein the chamber of each of the first and subsequent tank is configured such that the pressure within the respective chamber decreases as the respective condensation valve is in the open position and the water vapor exits the chamber under pressure and enters the respective condensing tube; and
   an intake valve operatively disposed in the inlet opening of the first tank and configured to move between an open position and a closed position;
   wherein saline water is permitted to enter the chamber of the first tank through the inlet opening when the intake valve is in the open position;
   wherein saline water is prevented from entering the chamber of the first tank through the inlet opening when the intake valve is in the closed position;
   wherein the first tank defines an outlet opening near the bottom portion; and
   wherein the first condensing tube includes a flow section fluidly extending between the outlet opening, the condensing section, and the inlet opening of the subsequent tank.

2. A water purification system, as set forth in claim 1, further comprising an outlet valve operatively disposed in the outlet opening of the first tank;
   wherein the outlet valve is configured to move between an open position and a closed position;
   wherein water is configured to flow from the first tank into the first condensing tube through the outlet opening when the outlet valve is in the open position; and
   wherein water from the first tank is prevented from entering the condensing tube through the outlet opening when the outlet valve is in the closed position.

3. A water purification system, as set forth in claim 2, further comprising:
   a purge line fluidly extending from each of the first chamber and the second chamber;
   wherein each purge line is configured to be in fluid communication with the body of water;
   a purge valve operatively disposed in each of the purge lines;
   wherein the purge valves are configured to move between an open position and a closed position;

wherein water is configured to flow from the tank to the body of water when the purge valve is in the open position; and wherein water is prevented from flowing from the tank to the body of water when the purge valve is in the closed position.

4. A water purification system, as set forth in claim 3, wherein the purge lines are formed of a flexible material configured to float in the water within the respective tank.

5. A water purification system, as set forth in claim 3, further comprising at least one sensor configured to be operatively connected to the chamber of each of the first and subsequent tank;

wherein the at least one sensor is configured to sense a value within at least one of the chambers.

6. A water purification system, as set forth in claim 5, further comprising a controller operatively connected to the at least one sensor and to at least one of the condensation valve, the intake valve, the outlet valve, and the purge valve;

wherein the controller is configured to send a signal to move the at least one of the condensation valve, the intake valve, the outlet valve, and the purge valve to a desired one of the open position and the closed position.

7. A water purification system, as set forth in claim 1, further comprising a reservoir configured to receive potable water from the subsequent condensing tube.

8. A water purification system, as set forth in claim 5, wherein the subsequent tank is further defined as a last tank and the subsequent condensing tube is further defined as a last condensing tube, wherein the water purification system further comprises:

an intermediate tank configured to be disposed within the body of water such that a top portion of the intermediate tank is above a water line of the body of water and a remainder of the intermediate tank is submerged beneath the water line of the body of water;

wherein the intermediate tank is operatively disposed between the first tank and the subsequent tank;

wherein the intermediate tank defines:
a chamber configured for holding a volume of fluid;
an inlet opening near a bottom portion; and
a vent opening defined in the top portion;

a first condensing tube fluidly extending between the vent opening of the first tank and the inlet opening of the intermediate tank;

wherein the first condensing tube is configured to receive desalinated water vapor from the vent opening of the first tank and condense the water vapor such that a vacuum is created to draw salinated water from the first tank to mix with the desalinated water vapor, whereby condensed potable water is provided to the intermediate tank through the respective inlet opening;

an intermediate condensing tube fluidly extending between the vent opening of the intermediate tank and the inlet opening of the subsequent tank;

wherein the intermediate condensing tube is configured to receive water vapor from the vent opening of the intermediate tank such that a vacuum is created to draw salinated water from the intermediate tank to mix with the desalinated water vapor, whereby condensed potable water is provided to the subsequent tank through the respective inlet opening;

a further condensation valve operatively disposed in the intermediate condensing tube;

wherein each condensation valve is configured to move between an open position and a closed position;

wherein the chamber of each of the first, intermediate, and subsequent tanks is configured such that a pressure within the respective chamber increases as the respective condensation valve is in the closed position and the water vapor within the respective chamber increases; and wherein the chamber of each of the first, intermediate, and subsequent tanks is configured such that the pressure within the respective chamber decreases as the respective condensation valve is in the open position and the water vapor exits the chamber under pressure and enters the respective condensing tube.

9. A water purification system, as set forth in claim 1, further comprising:

an inlet intake line fluidly connected to the first tank and configured to be in fluid communication with the body of water; and a filter disposed in fluid communication with the inlet intake line to the first tank;

wherein the filter is configured to prevent objects from entering the chamber from the body of water.

10. A water purification system configured to operate in a body of water containing saline water, the water purification system comprising:

a first tank and a subsequent tank configured to be disposed within the body of water such that a top portion of each tank is above a water line of the body of water and a remainder of each tank is submerged beneath the water line of the body of water;

wherein the first tank and the subsequent tank each define:
a chamber configured for holding a volume of fluid;
an inlet opening near a bottom portion, wherein the bottom portion is disposed opposite the top portion; and
a vent opening defined in the top portion;

a first condensing tube fluidly extending between the vent opening of the first tank and the inlet opening of the subsequent tank;

wherein the first condensing tube is configured to receive water vapor from the vent opening of the first tank and condense the water vapor such that condensed potable water is provided to the subsequent tank through the respective inlet opening;

wherein the first condensing tube includes a condensing section extending between the inlet opening of the subsequent tank and the collection section and configured to condense the water vapor received in the respective collection section such that condensed potable water is provided to the subsequent tank through the respective inlet opening;

a subsequent condensing tube fluidly extending from the vent opening of the subsequent tank;

wherein the subsequent condensing tube is configured to receive water vapor from the vent opening of the subsequent tank and condense the water vapor such that condensed potable water is provided;

wherein the first and subsequent condensing tube each include a collection section extending from the respective vent opening;

wherein the collection section is configured to receive the water vapor from the respective first and subsequent tank;

a condensation valve operatively disposed in each of the first and subsequent condensing tubes;

wherein the condensation valves are configured to move between an open position and a closed position;

wherein the chamber of each of the first and subsequent tank is configured such that a pressure within the respective chamber increases as the respective condensation valve is in the closed position and water vapor within the respective chamber increases; and wherein the chamber of each of the first and subsequent tank is configured such that the pressure within the respective chamber decreases as the respective condensation valve is in the open position and the water vapor exits the chamber under pressure and enters the respective condensing tube;

an intake valve operatively disposed in the inlet opening of the first tank and configured to move between an open position and a closed position;

wherein saline water is permitted to enter the chamber of the first tank through the inlet opening when the intake valve is in the open position;

wherein saline water is prevented from entering the chamber of the first tank through the inlet opening when the intake valve is in the closed position;

wherein the first tank defines an outlet opening near the bottom portion; and wherein the first condensing tube includes a flow section fluidly extending between the outlet opening, the condensing section, and the inlet opening of the subsequent tank at least one sensor configured to be operatively connected to the chamber of each of the first and subsequent tank;

wherein the at least one sensor is configured to sense a value within at least one of the chambers; and a controller operatively connected to the at least one sensor and the condensation valves;

wherein the controller is configured to send a signal to move the condensation valves to a desired one of the open position and the closed position.

* * * * *